US009754347B2

United States Patent
Sartor et al.

(10) Patent No.: US 9,754,347 B2
(45) Date of Patent: Sep. 5, 2017

(54) METHOD AND DEVICE FOR SIMULATING A WIDE FIELD OF VIEW

(71) Applicant: Sony Corporation, Minato-ku (JP)

(72) Inventors: Piergiorgio Sartor, Fellbach (DE); Klaus Zimmermann, Neckartenzlingen (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/588,523

(22) Filed: Jan. 2, 2015

(65) Prior Publication Data

US 2015/0254802 A1 Sep. 10, 2015

(30) Foreign Application Priority Data

Mar. 10, 2014 (EP) .................................... 14158646

(51) Int. Cl.
*G09G 5/00* (2006.01)
*G06T 3/40* (2006.01)
*G02B 27/01* (2006.01)

(52) U.S. Cl.
CPC ............ *G06T 3/40* (2013.01); *G02B 27/0101* (2013.01); *G02B 27/017* (2013.01); *G02B 27/0172* (2013.01); *G02B 2027/014* (2013.01); *G02B 2027/0123* (2013.01)

(58) Field of Classification Search
CPC .... G09G 5/02; G09G 5/06; G09G 2320/0666; G09G 5/363; G06T 11/001
USPC ........................................................ 345/660
See application file for complete search history.

(56) References Cited

U.S. PATENT DOCUMENTS

| 5,526,442 A * | 6/1996 | Baba ........................ G06T 5/006 382/132 |
| 5,598,297 A | 1/1997 | Yamanaka et al. |
| 7,528,846 B2 * | 5/2009 | Zhang .................. H04N 7/0122 345/619 |
| 8,212,859 B2 | 7/2012 | Tang et al. |
| 8,213,064 B2 | 7/2012 | Yona et al. |
| 9,097,891 B2 * | 8/2015 | Border ............... G02B 27/0093 |
| 2007/0126932 A1 * | 6/2007 | Bhat ...................... H04N 5/144 348/578 |

(Continued)

FOREIGN PATENT DOCUMENTS

WO WO 2013/014177 A1 1/2013
WO WO 2013/076994 A1 5/2013

OTHER PUBLICATIONS

"Ultrawide Foveated Video Extrapolation" (IEEE Journal of Selected Topics in Signal Processing, vol. 5, No. 2, Apr. 2011, by Tamar Avraham and Yoav Y. Schechner, Member, IEEE).*

(Continued)

*Primary Examiner* — Ke Xiao
*Assistant Examiner* — Gordon Liu
(74) *Attorney, Agent, or Firm* — Oblon, McClelland, Maier & Neustadt, L.L.P.

(57) ABSTRACT

It is disclosed a method for displaying input image data on a display device. The display device comprises a main display and a border display which at least partly surrounds the main display. The method comprises extrapolating the input image data to obtain extrapolated image data, displaying at least part of the input image data on the main display, and displaying at least part of the extrapolated image data on the border display.

18 Claims, 7 Drawing Sheets

(56) References Cited

U.S. PATENT DOCUMENTS

2008/0174659 A1    7/2008  McDowall
2014/0362001 A1*  12/2014  Westerman ............. G06F 3/041
                                                    345/173

OTHER PUBLICATIONS

"Inpainting", https://en.wikipedia.org/wiki/Inpainting, 2004, 5 pages.
Shay Gepstien et al. "Subjective continuity: combining perceptual and metric extrapolation", https://www.math.ucdavis.edu/~saito/confs/SSP09/yosi_ssp09_inpainting.pdf, 26 pages.
Seona Kim et al. "A Layered Inpainting Method for Virtual View Synthesis", http://spl.snu.ac.kr/images/6/6a/C236.pdf , 9 pages.
Amit Aides et al. "Multiscale Ultrawide Foveated Video Extrapolation", Proc. IEEE Int. Conference on Computational Photography (ICCP), 2011, 8 pages.

* cited by examiner

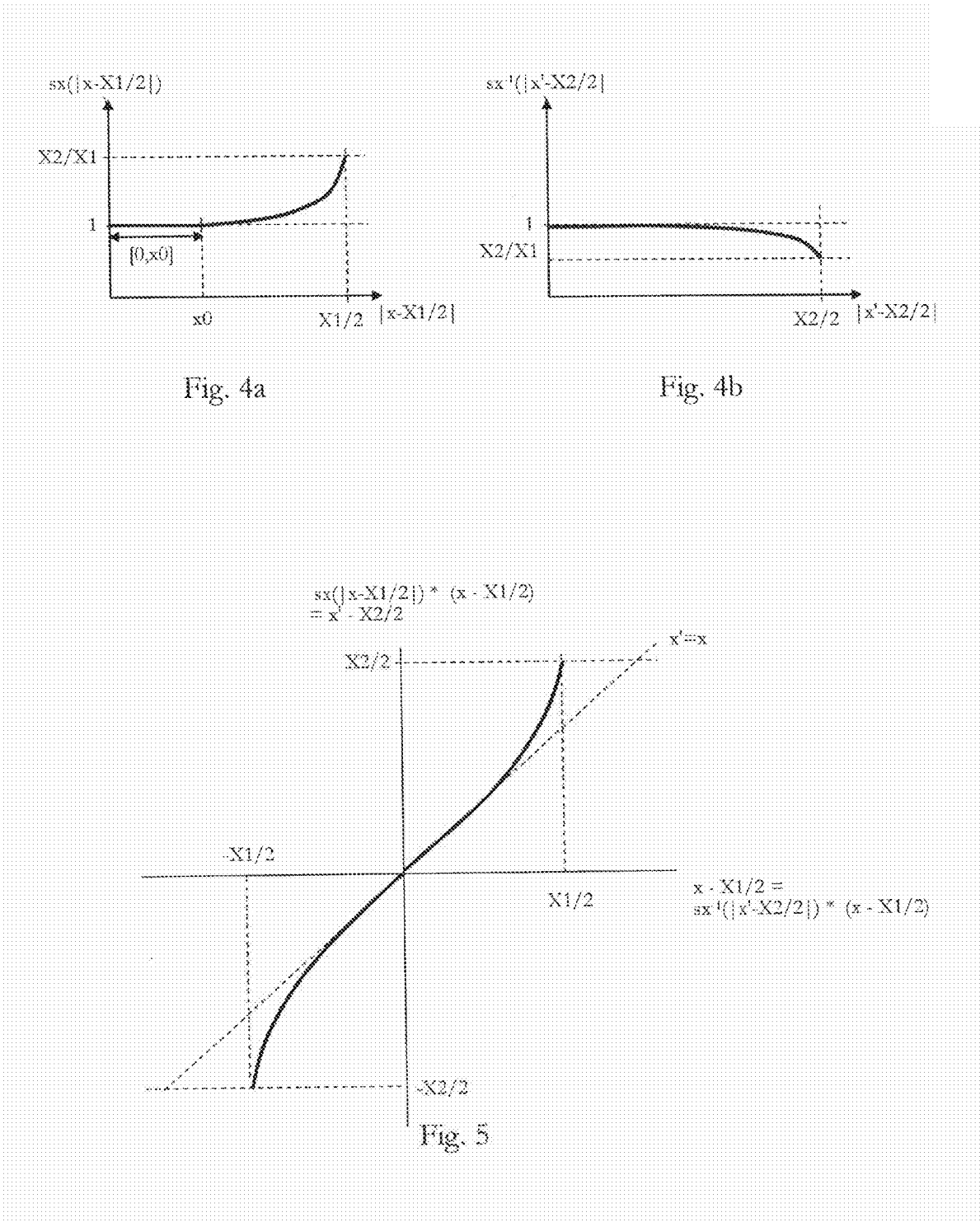

METHOD AND DEVICE FOR SIMULATING A WIDE FIELD OF VIEW

TECHNICAL FIELD

The present disclosure generally pertains to a method and an electronic device for simulating a wide field of view. The method and electronic device may be used in a display device, e.g. in a head mounted display, to display video or image data.

TECHNICAL BACKGROUND

One possible application of Head Mounted Displays (HMDs) is the "Personal Display" (PD). A Personal Display is a Head Mounted Display that is tailored for watching movies or similar content. However, the field of view (FOV) of video or image data can be limited to ~30 degrees, since the video content is usually shot with this field of view in mind, i.e. for normal video content it is assumed that the viewing distance from the screen is proportional to the screen diagonal so that the field of view is ~30 degrees. While this field of view fits perfectly the requirements for normal television screens, it may still be uncomfortable to view movies at a field of view of ~30 degrees looking through a Personal Display and to have the surrounding environment fully black.

SUMMARY

According to a first aspect the disclosure provides a method for displaying input image data on a display device, the display device comprising a main display and a border display which at least partly surrounds the main display, the method comprising extrapolating the input image data to obtain extrapolated image data, displaying at least part of the input image data on the main display, and displaying at least part of the extrapolated image data on the border display.

According to a second aspect, the disclosure provides a display device, the display device comprising a main display, a border display which at least partly surrounds the main display, and a processor, configured to extrapolate input image data to obtain extrapolated image data, display at least part of the input image data on the main display, and display at least part of the extrapolated image data on the border display.

Further aspects are set forth in the dependent claims, the following description and the drawings.

BRIEF DESCRIPTION OF THE DRAWINGS

Embodiments are explained by way of example with respect to the accompanying drawings, in which:

FIG. 4a shows an embodiment of a scaling function sx;

FIG. 4b shows an embodiment of an inverse scaling function $sx^{-1}$;

FIG. 5 schematically shows the result of a mapping;

DETAILED DESCRIPTION OF EMBODIMENTS

Figure 1:
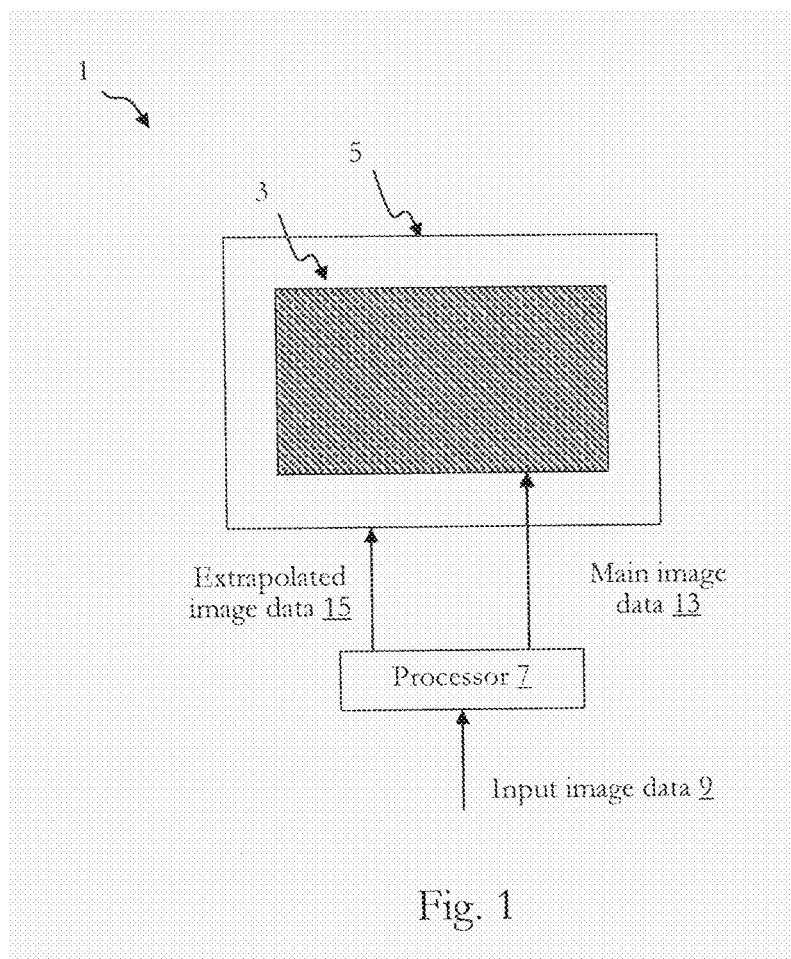
FIG. 1 schematically shows an embodiment of a display device.

Before a detailed description of the embodiments under reference of FIG. 1, general explanations are made.

A current Personal Display (PD) usually delivers a narrow field of view (FOV) of about 30 degrees. This fits the requirements, but since the display is head mounted (HMD), all the surroundings are usually black. The human vision system (HVS) does not have good spatial resolution at the peripheral; nevertheless, it is very sensible to motion, light and colour changes. That is why it can be uncomfortable to watch content with static black surroundings. It might thus be more comfortable to have content in the surrounding areas, too. But as normal video or image data usually is made for a field of view of ~30 degrees, content for the surrounding areas must be created so that it covers these areas.

Here techniques are disclosed which help to fill these "surroundings" with some simulated content, correlated with the content of the central view.

In particular, a method it is disclosed for displaying input image data on a display device, the display device comprising a main display and a border display which at least partly surrounds the main display. The method comprises extrapolating the input image data to obtain extrapolated image data, displaying at least part of the input image data on the main display, and displaying at least part of the extrapolated image data on the border display.

Input image data may comprise video images or still images. The input image data may correspond to non-compressed or compressed video image data such as MPEG video data, or non-compressed or compressed video image data such as JPG, GIF, or the like.

In the embodiments, the main display is arranged for foveal viewing and thus preferably provides a good screen resolution.

In the embodiments, the border display is arranged for parafoveal viewing and thus is located in the area surrounding the main display. The border display may have a screen resolution that is the same or different from that of the main display. As the border display is arranged for parafoveal viewing, the border display may in particular have a smaller screen resolution than the main display.

The main display and the border display may for example be Liquid Crystal Displays (LCD) or Plasma Display Panels (PDP) of given screen resolutions, or the like. The border display may even be comprised of only a small number of LEDs that provide a very low screen resolution.

The main display and the border display may be flat or curved. The main display and the border display may have rectangular shapes or curved shapes, such as an oval shape. In the embodiments disclosed, the main display has a rectangular shape and the border display has a frame like shape and completely surrounds the main display.

In the disclosed embodiments, the input image data is bitmap data that represents an image with a resolution which fits to that of the main display. In other embodiments, the input image data may have a resolution different to that of the main display. In such cases, the input image data may be scaled to fit the screen resolution of the main display with techniques known in the art.

Extrapolating the input image data may be based on part of the input image data or the full input image data. In the disclosed embodiments, extrapolating the input image data is not only based on border pixels of the input image, but is also based on input image data which represents inner parts of the input image. This allows that structures, textures and even objects can be extrapolated to produce content for displaying on the border display.

According to an embodiment, extrapolating the input image data may comprise scaling the input image data.

The scaling of the input image data may be based on a non-linear scaling algorithm. Scaling the input image data may result in that at least parts of the input image data are extrapolated for displaying on the border display and that at least other parts of the input image data remain for displaying on the main display.

For example, extrapolating the input image data may be based on the mapping functions $$x'=sx(|x-X1/2|)*(x-X1/2)+X2/2$$

$$y'=sy(|y-Y1/2|)*(y-Y1/2)+Y2/2$$

where x and y are pixel coordinates describing the location of a pixel on the main display, x' and y' are pixel coordinates describing the location of a pixel on the border display, X1 and Y1 denote the dimensions of the main display in pixels, X2 and Y2 denote the dimensions of the border display in pixels, and sx and sy are predefined scaling functions.

According to other embodiments, extrapolating the input image data is based on a multiscale foveated video extrapolation technique.

Other techniques such as using trained filters or a linear scaling might also be used for extrapolating the input image data.

The method may further comprise detecting and removing black borders in the input image data.

Further, a display device is disclosed, the display device comprising a main display, a border display which at least partly surrounds the main display, and a processor. The processor is configured to extrapolate input image data to obtain extrapolated image data, display at least part of the input image data on the main display, and display at least part of the extrapolated image data on the border display.

In the display device the main display may be arranged to provide a normal field of view of ~30 degrees and the border display may be arranged to enlarge the field of view above 30 degree, for example up to 100 degrees, or even up to ~200 degrees or more.

Further, a head mounted display is disclosed, the head mounted display comprising the above described display device. When applied in a head mounted display, the main display of the electronic device typically comprises a first main display and a second main display for displaying input image data to a left eye and, respectively, to a right eye, and the border display of the electronic device comprises a first border display and a second border display for displaying input image data to a left eye and, respectively, to a right eye.

Display Device

FIG. 1 schematically shows an embodiment of a display device 1. The display device 1 comprises a main display 3, and a border display 5 which at least partly surrounds the main display 3. A processor 7 is configured to receive input image data 9. The input image data 9 relates to a media file or media stream, such as video data. In the case of video data, each video frame may be independently processed as input image data 9. Alternatively, multiple video frames may be processed together as input image data.

The processor is further configured to extrapolate the input image data 9 to obtain extrapolated image data 15. The processor displays at least part of the input image data 9 on the main display 3. Further, the processor 7 displays at least part of the extrapolated image data 15 on the border display 5.

Figure 2A:
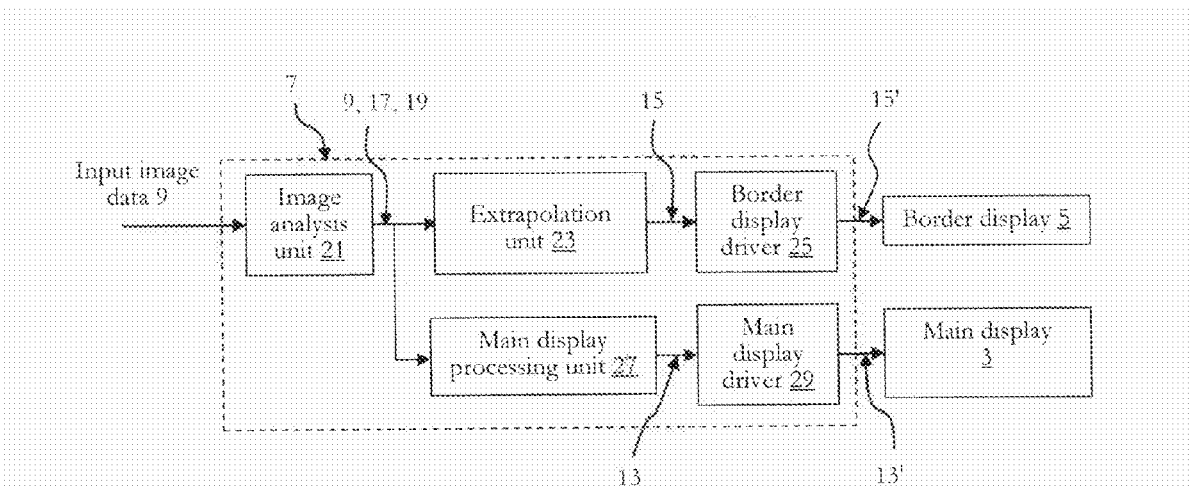
FIG. 2a schematically shows an embodiment of a processor.

FIG. 2a schematically shows an embodiment of processor 7. The processor comprises an image analysis unit 21 which is arranged to receive input image data 9. The image analysis unit 21 is configured to determine characteristics of the input image data 9, such as image resolution, etc. For example, the input image data 9 may be MPEG4-coded video data with an image resolution of 1280×720 pixels.

The image analysis unit 21 may also be configured to perform other processes to analyze the input image data 9. For example, the image analysis unit 21 may be configured to implement a black border detection process that detects black border information 19 which identifies pixels in the input image data 11 which relate to black borders.

The image analysis unit 21 passes the input image data 9, the detected image resolution 17, and any black border information 19 to extrapolation unit 23. Extrapolation unit 23, if necessary, removes black border pixels based on the black border information 19 received from the image analysis unit 21, and extrapolates the input image data 9 to obtain extrapolated image data 15. This extrapolation is described in more detail below with reference to FIGS. 3, 4a, 4b, 5, and 6. The extrapolation unit 23 passes the extrapolated image data 15 to a border display driver 25. The border display driver 25 converts the extrapolated image data 15 into respective electronic signals 15' which are passed to border display 5. Border display 5 is configured to receive the electronic signals 15' from border display driver 25 and to display the corresponding extrapolated image data 15.

The image analysis unit 21 also passes the input image data 9 and the detected image resolution 17, and any black border information 19 to a main display processing unit 27. This main display processing unit 27 processes the input image data 9 to obtain main image data 13. For example, the main display processing unit 27 may be configured to remove any image data from the input image data 9 that is identified by the black border information 19 as relating to black borders. The main display processing unit 27 passes the main image data 13 to a main display driver 29. The main display driver 29 converts the main image data 13 into respective electronic signals 13' which are passed to main display 3. Main display 3 is configured to receive the electronic signals 13' from main display driver 29 and to display the corresponding main image data 13. In the embodiments described below it can be assumed that the main display data 13 and the input image data 9 are at least to some extent the same.

Figure 2B:
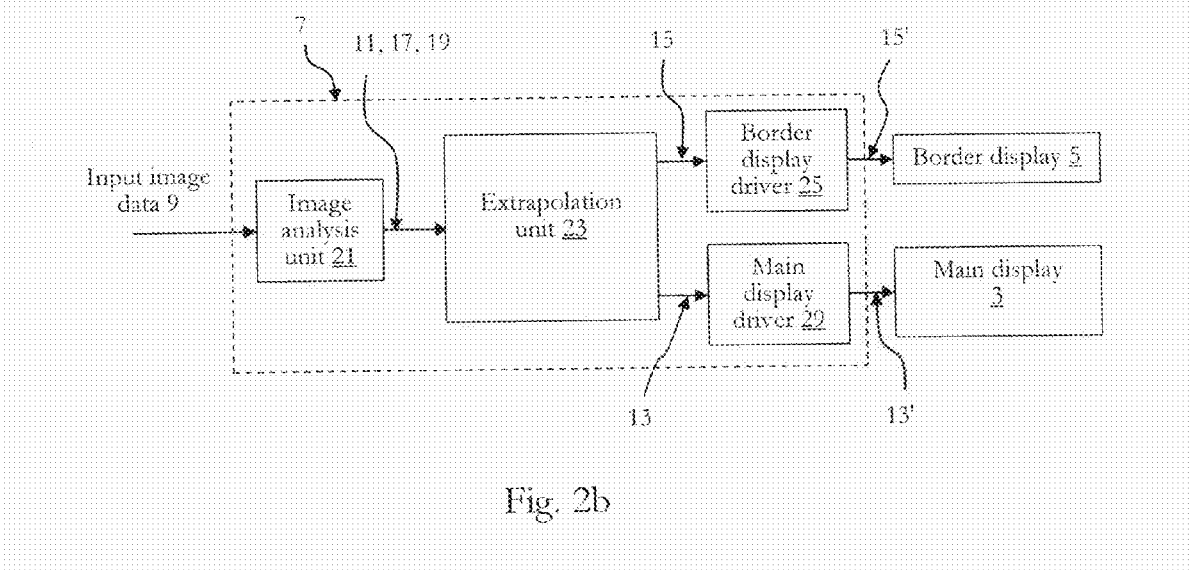
FIG. 2b schematically shows an alternative embodiment of a processor.

In the embodiment of FIG. 2a, two separate units, namely extrapolation unit 23 and main display processing unit 27, are shown which independently generate the extrapolated image data 15 and the main image data 13. These units must not necessarily be separate physical entities. FIG. 2b shows an alternative embodiment, in which a single unit, namely extrapolation unit 23, is configured to process the input image data 9 and to generate the extrapolated image data 15 and the main image data 13 from this input image data 9.

Likewise, despite that in FIGS. 2a and 2b the image analysis unit 21, the extrapolation unit 23, the main display processing unit 27, the border display driver 25 and the main display driver 29 are shown as separate units, the functionality of these units must not necessarily be performed by separate physical entities. In general processor 7 of FIG. 7 can be configured in many alternative ways to provide the functionality disclosed in this application.

Figure 3:
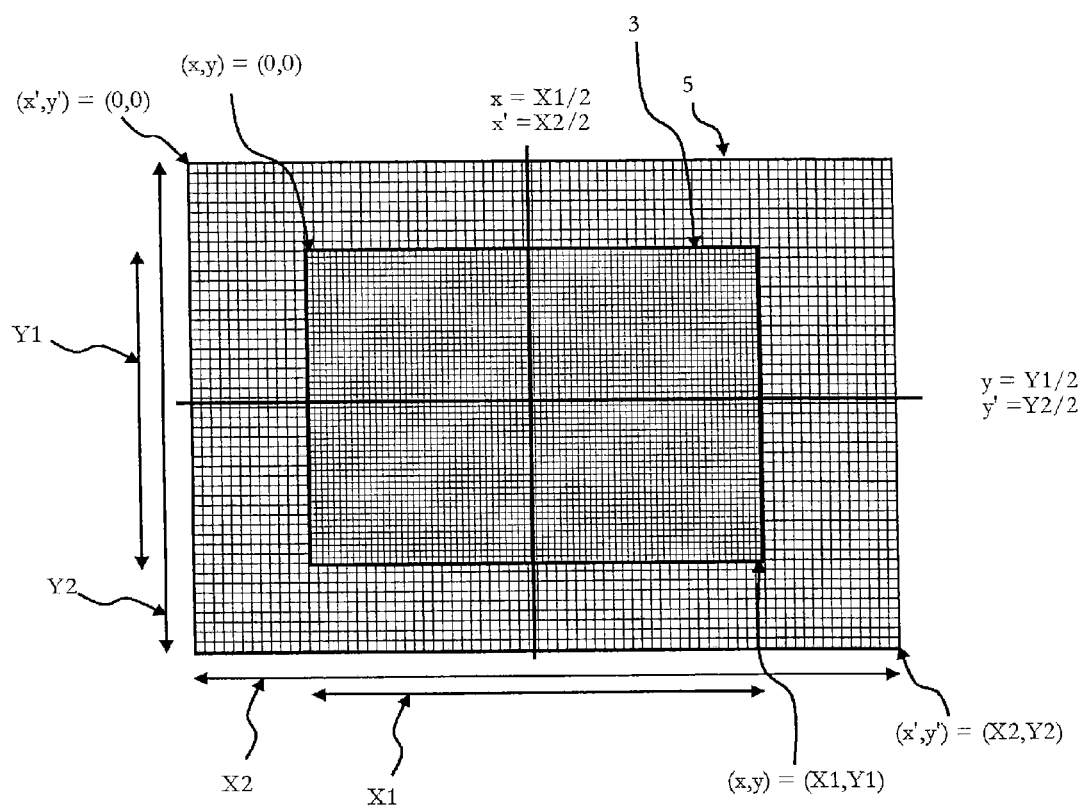
FIG. 3 schematically shows in more detail an embodiment of a main display and a border display.

FIG. 3 schematically shows in more detail an embodiment of main display 3 and border display 5.

Main display 3 is a rectangular LCD display with a screen resolution of X1,Y1 pixels. (x,y)=(0,0) describes the pixel which is located in the upper-left corner of the display. (x,y)=(X1,Y1) describes the pixel which is located in the lower-right corner of the display.

Border display 5 is a rectangular LCD display with a screen resolution of X2,Y2 pixels. (x',y')=(0,0) describes the pixel which is located in the upper-left corner of the display. (x',y')=(X2,Y2) describes the pixel which is located in the lower-right corner of the display. Border display 5 has a frame-like shape. That is, it surrounds main display 3 and does not comprise any pixels in the center region which is already covered by pixels of the main display 3.

In this embodiment, the screen resolution of the border display 5 is smaller than that of the main display 3. For example, the main display 3 might have a screen resolution of X1, Y1=1280×720 pixels and the border display 5 might have a screen resolution of X1, Y1=640×480 pixels, or even less. In other embodiments, the screen resolution of the border display 5 may be the same as that of main display 3.

The main display 3 provides a field of view of ~30 degrees which is the field of view normal video content is typically produced for. The border display 5 extends this field of view of ~30 degrees to a larger field of view. FIG. 3 gives only an exemplifying and schematic representation of the two displays. The border display 5 might for example extend the field of view to values such as ~200 degrees. To achieve such a large field of view, the border display 5 could be, other than depicted in the embodiment of FIG. 3, much larger than the main display 3.

The input image data 9 of FIG. 1 is typically designed for a field of view of ~30 degrees, and thus for displaying on the main display 3. For example, the resolution of the input image data 9 might have a resolution of 1280×720 pixels and thus fit to the resolution of the main display 3. Such input image data 9 would not yet contain image data for displaying at a larger field of view, i.e. on the border display 5. Image data for displaying on the border display 5 is generated by extrapolation of the input image data 9 in extrapolation unit 23.

Extrapolation by Non-Linear Scaling

FIGS. 4a and 4b schematically describe in more detail an embodiment of functionality which is performed by extrapolation unit 23 of FIG. 2a or FIG. 2b.

According to the embodiment of FIGS. 4a, and 4b the extrapolation unit 23 performs a non-linear scaling process on the input image data 9 to produce extrapolated image data 15 for displaying on border display 5. The non-linear scaling process is schematically represented by a scaling function s.

The scaling function s is configured to map the input image (which is designed for display on the main display 3) so that it covers the field of view of the border display 5, i.e. to map the pixels (x,y) of the main display 3, i.e. the dimension X1, Y1, to the pixels (x', y') and the dimensions X2, Y2 of the border display 5.

In the embodiment described below, it is assumed that the pixel resolution of the border display 5 is the same as the pixel resolution of main display 3.

According to the embodiment described here, the scaling function is decomposed into two parts sx and sy, where sx is applied to the x coordinates and sy is applied to y-coordinates, according to:

$$x'=sx(|x-X1/2|)*(x-X1/2)+X2/2 \qquad \text{eq. (1)}$$

$$y'=sy(|y-Y1/2|)*(y-Y1/2)+Y2/2 \qquad \text{eq. (2)}$$

The scaling functions sx(|x−X1/2|) and sy(|y−Y1/2|) describe scaling factors.

The principles of scaling are described here with regard to the x-dimension part sx of the scaling function only. For the y-dimension part of the scaling function the same principles do apply.

FIG. 4a shows an embodiment of a scaling function sx. The scaling function sx receives a shifted version of the input image data 9 in which the input image is shifted by −X1/2. This means that the scaling function sx is centered at the center of the input image, respectively the center of the main display 3 which is at x=X1/2. Further, the scaling function sx according to this embodiment is symmetric with respect to the center, which means that s(x)=s(−x). FIG. 4a thus depicts s(|x−X1/2|), where x is the x-coordinate of the input image.

As can be seen in FIG. 4a, for x=X1/2, the scaling function is sx(|x−X1/2|=s(0)=1. This means that according to eq. (1) the center x=X1/2 of the main display 3 is mapped to x'=X2/2, i.e. to the (virtual) center of the border display 5.

Further, as can be seen in FIG. 4a, for x=X1 (i.e. for pixels at the right boundary of the main display 3) the scaling function is sx(|x−X1/2|)=sx(X1/2)=X2/X1. According to eq. (1), such pixels are mapped to x'=sx(X1−X1/2)*(X1−X1/2)+X2/2=X2/X1*X1/2+X2/2=X2. That is, pixels at the right boundary of the main display 3 are mapped to pixels at the right boundary of the border display 3.

Further, as can be seen in FIG. 4a, for x=0 (i.e. for pixels at the left boundary of the main display 3) the scaling function is sx(|x−X1/2|)=sx(X1/2)=X2/X1. According to eq. (1), such pixels are mapped to x'=sx(X1/2)*(0−X1/2)+X2/2=X2/X1*(−X1/2)+X2/2=0. That is, pixels at the left boundary of the main display 3 are mapped to pixels at the left boundary of the border display 3.

Further, as can be seen in FIG. 4a, the scaling function sx has a value of substantially 1 in the interval [0,x0] which corresponds to a center region of the input image. This means that x'=x in a center region of the input image. In other words, in the interval [0,x0] of the scaling function sx the scaling factor sx is substantially 1 so that the center of the image remains substantially unscaled. The scaling function sx then increases in a strictly monotonic way until the scaling factor reaches its maximum X2/X1 for |x−X1/2|=X1/2, i.e. at the left and right boundaries x=0 and x=X1 of the main display 3 (respectively the input image 9).

FIG. 4b shows an embodiment of an inverse scaling function sx$^{-1}$. The inverse scaling function sx$^{-1}$ is configured to do the inverse of the scaling function sx. It is configured to map pixels of the border display 5 to pixels of the main display 3, i.e. to map the pixels (x',y') of the border display 5, i.e. the dimension X2, Y2, to the pixels (x, y) and the dimensions X1, Y1 of the main display 3:

$$x=sx^{-1}(|x'-X2/2|)*(x'-X2/2)+X1/2 \qquad \text{eq. (3)}$$

$$y=sy^{-1}(|y'-Y2/2|)*(y'-Y2/2)+Y1/2 \qquad \text{eq. (4)}$$

Let (x',y') describe a pixel of the border display 5, then equations (3) and (4) can be used to determine the pixel (x,y) of the main display 3 which in the scaling process maps to this pixel (x',y'). Thus, according to equations (3) and (4), the color c(x',y') of a pixel (x',y) of border display 3 can be obtained from the color c(x,y) of the corresponding pixel (x,y) of the main display 3 as c(x',y')=c(x,y). As the input image data 9 and the main display 3 are both designed for a field of view of ~30 degrees, the color c(x,y) of pixel (x,y) of the main display 3 can directly be identified in the input image data 9. It is thus described in this embodiment a process of extrapolating the input image data 9 to obtain extrapolated image data for displaying on the border display 5 using a non-linear scaling function.

FIG. 5 schematically shows the result of the mapping of eq. (1). On the abscissa of the coordinate system it is plotted x–X1/2, i.e. the origin of the coordinate system of FIG. 5 is positioned in the center of the main display 3. On the ordinate of the coordinate system it is plotted sx(x–X1/2)*(x–X1/2), which is the result of the mapping of equation (1), shifted by –X2/2, i.e. with the origin of the coordinate system positioned in the center of border display 5.

As the values plotted on the abscissa equal to $sx^{-1}(x'-X2/2)$ and the values plotted on the ordinate equal to x'–X2/2, the graph of FIG. 5, can also be seen as displaying the result of the inverse mapping of equation (3), point mirrored at the origin of the coordinate system. The inverse scaling function $sx^{-1}$ can thus be obtained from the scaling function sx by mirroring and numerical evaluations.

It can be seen in FIG. 5 that the mapping functions of eq. (1) and (3) leave the center of the image substantially unsealed.

The same principles can be applied in embodiments, in which the pixel resolution of the border display 5 is smaller than the pixel resolution of main display 3. In such embodiments, the equations shown above can be adapted to the pixel resolution of the border display. Alternatively, for the purpose of the mapping, the border display 5 can be assumed to (virtually) have the same pixel resolution as the main display 3, and, after having performed the non-linear scaling as described above, a linear downscaling process can be applied to adapt the result of the non-linear scaling to the specific pixel resolution of the border display 5.

Multiscale Foveated Video Extrapolation

According to other embodiments, extrapolating the input image data is based on a multiscale foveated video extrapolation technique such as described by Amit Aides et al in "Multiscale Ultrawide Foveated Video Extrapolation", Proc. IEEE Int. Conference on Computational Photography (ICCP), 2011.

The multiscale foveated video extrapolation technique relates to video inpainting, which is also known as video completion. As described in the above reference, in video inpainting, the missing parts are inside the field of view, while the multiscale foveated video extrapolation technique extrapolation technique aims at extending the video beyond the field of view. The multiscale foveated video extrapolation technique imitates the behavior of the human fovea by diminishing the resolution towards the boundaries of the extrapolated region.

As described in more detail by Amit Aides et al, the multiscale foveated video extrapolation technique applies a so called multistep "Outside-In" approach. The extrapolation starts with the coarsest scale, processing the whole extrapolation domain. Then the other resolutions scales are used consecutively from coarse to fine, where a finer scale applies to a smaller (inner) domain. The "Outside-In" method uses the information extrapolated in coarse scales to initialize extrapolation at finer scales. The inner domains of the output video are processed several times, in different resolution scales, gradually refining the result.

Figure 6:
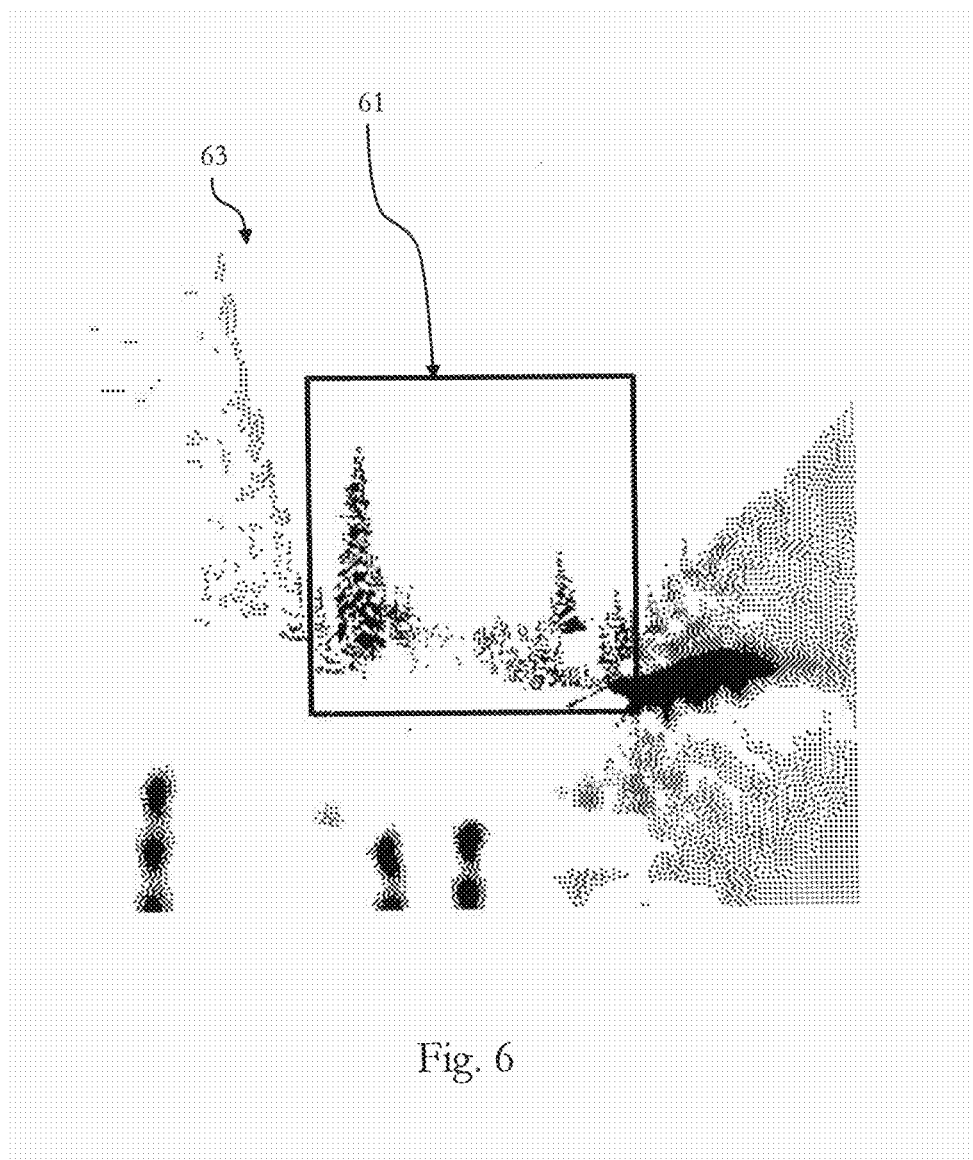
FIG. 6 shows an exemplifying result of the multiscale foveated video extrapolation technique.

FIG. 6 shows an exemplifying result of the multiscale foveated video extrapolation technique. An inner domain image 61 is extrapolated to produce an outer domain image 63. The outer domain image 63 shows structures which resemble structures found in the inner domain image 61.

In alternative embodiments, other video extrapolation techniques such as those based on an "Inside-Out" approach are used. As described in more detail by Amit Aides et al, the "Inside-Out" approach, starts at the finest resolution level, i.e. the innermost domain, and proceeds outwards from fine to coarse.

Other inpainting approaches may also be adapted for use in extrapolating the input image data to obtain extrapolated image data.

Method for Displaying Input Image Data

Figure 7:
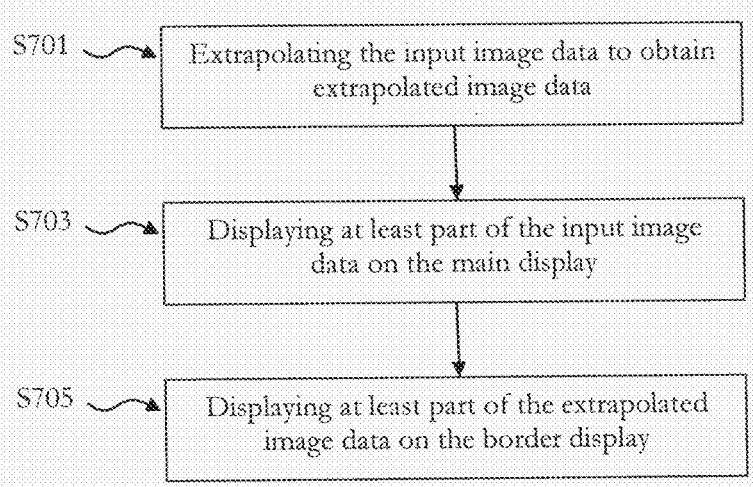
FIG. 7 shows an embodiment of a method for displaying input image data on a display device.

In FIG. 7 it is shown an embodiment of a method for displaying input image data on a display device, the display device comprising a main display and a border display which at least partly surrounds the main display. At S701, input image data is extrapolated to obtain extrapolated image data. At S703, at least part of the input image data is displayed on the main display. At S705, at least part of the extrapolated image data is displayed on the border display. The extrapolating at S703 can for example be performed as described above, i.e. by non-linear scaling, by multiscale foveated video extrapolation, or by other extrapolation techniques.

Head Up Display

Figure 8:
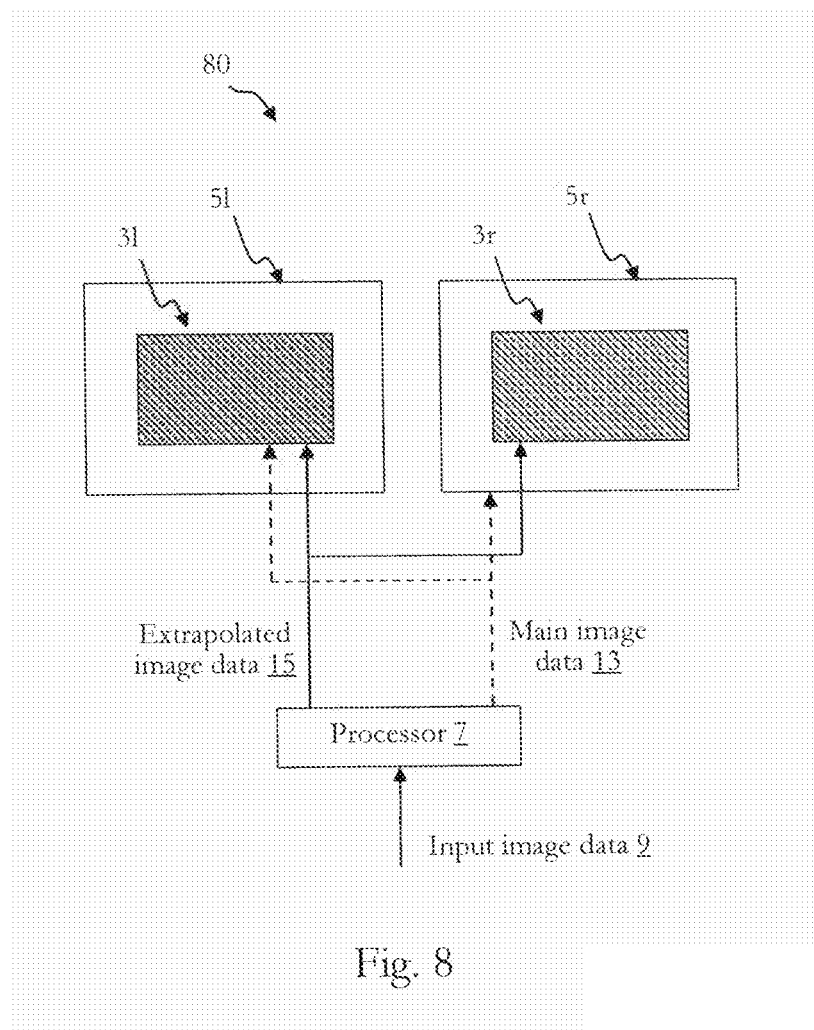
FIG. 8 shows an embodiment of a head mounted display comprising the display device.

In FIG. 8 it is shown an embodiment of a head mounted display 80 comprising the display device as described above. A main display 3l, 3r of the electronic device comprises a first main display 3l and a second main display 3r for displaying input image data to a left eye and, respectively, to a right eye. A border display 5l, 5r of the electronic device comprises a first border display 31 and a second border display 3r for displaying input image data 9 to a left eye and, respectively, to a right eye. A processor 7 is arranged to process the input image data 9 to produce extrapolated image data 15 for displaying on the border display 5l, 5r and main image data 13 for displaying on the main display 3l, 3r.

All units and entities described in this specification and claimed in the appended claims can, if not stated otherwise, be implemented as integrated circuit logic, for example on a chip, and functionality provided by such units and entities can, if not stated otherwise, be implemented by software.

It is disclosed in this application:

[1]. A method for displaying input image data on a display device, the display device comprising a main display and a border display which at least partly surrounds the main display, the method comprising extrapolating the input image data to obtain extrapolated image data, displaying at least part of the input image data on the main display, and displaying at least part of the extrapolated image data on the border display.

[2]. The method of [1], in which extrapolating the input image data comprises scaling the input image data.

[3]. The method of [1] or [2], in which extrapolating the input image data is based on a non-linear scaling algorithm.

[4]. The method of anyone of [1], [2] or [3], in which extrapolating the input image data is based on the mapping functions $$x' = sx(|x-X1/2|)*(x-X1/2)+X2/2$$

$$y' = sy(|y-Y1/2|)*(y-Y1/2)+Y2/2$$

where x and y are pixel coordinates describing the location of a pixel on the main display, x' and y' are pixel coordinates describing the location of a pixel on the border display, X1 and Y1 denote the dimensions of the main display in pixels, X2 and Y2 denote the dimensions of the border display in pixels, and sx and sy are predefined scaling functions.

[5]. The method of [1], in which extrapolating the input image data is based on a multiscale foveated video extrapolation technique.

[6]. The method of anyone of [1] to [5], further comprising detecting and removing black borders in the input image data.

[7]. A display device, the display device comprising
a main display,
a border display which at least partly surrounds the main display, and
a processor, configured to
extrapolate input image data to obtain extrapolated image data,
display at least part of the input image data on the main display, and
display at least part of the extrapolated image data on the border display.

[8]. The display device of [7] in which the main display is arranged to provide a normal field of view of about 30 degrees and in which the border display enlarges the field of view above 30 degree, or preferably up to 100 degrees, or more preferably up to about 200 degrees or more.

[9]. A head mounted display comprising the display device of [7] or [8], in which
the main display of the electronic device comprising a first main display and a second main display for displaying input image data to a left eye and, respectively, to a right eye, and
the border display of the electronic device comprising a first border display and a second border display for displaying input image data to a left eye and, respectively, to a right eye.

The invention claimed is:

1. A method for displaying input image data, the method comprising:
receiving the input image data by circuitry of a display device, the input image data representing a visual image for display;
extrapolating, by the circuitry, the input image data to obtain extrapolated image data based on mapping functions x' and y':

$$x'=sx(|x-X1/2|)*(x-X1/2)+X2/2; \text{ and}$$

$$y'=sy(|y-Y1/2|)*(y-Y1/2)+Y2/2;$$

controlling, by the circuitry, pixels of a main display of the display device to display a part of the input image data by emitting light corresponding to pixel values, included in the input image data, of the part of the input image data; and
controlling, by the circuitry, a border display of the display device to display a part of the extrapolated image data, wherein
the border display includes pixels that at least partially surround the pixels of the main display,
x and y are pixel coordinates describing a location of a pixel on the main display,
x' and y' are pixel coordinates describing a location of a pixel on the border display,
X1 and Y1 denote dimensions of the main display in pixels,
X2 and Y2 denote dimensions of the border display in pixels, and
sx and sy are predefined scaling functions.

2. The method of claim 1, wherein the extrapolating the input image data comprises scaling the input image data based on scaling functions sx and sy.

3. The method of claim 2, wherein the circuitry scales the input image data based on a non-linear scaling algorithm.

4. The method of claim 1, wherein the circuitry extrapolates the input image data based on a multiscale foveated video extrapolation technique.

5. The method of claim 1, further comprising:
detecting black borders in the input image data; and
removing, by the circuitry, the black borders from the input image data.

6. The method of claim 5, wherein the circuitry removes the black borders prior to extrapolation of the input image data.

7. The method of claim 1, wherein
the main display provides a field of view of less than or equal to 30 degrees, and
the border display enlarges the field of view to be greater than 30 degrees.

8. The method of claim 7, wherein
the border display enlarges the field of view to be up to 100 degrees.

9. The method of claim 7, wherein
the border display enlarges the field of view to be up to 200 degrees.

10. A display device, comprising:
a main display including first pixels that emit light;
a border display including second pixels that emit light, the second pixels at least partly surrounding the first pixels; and
circuitry configured to
receive input image data that represents a visual image for display,
extrapolate the input image data to obtain extrapolated image data based on mapping functions x' and y':

$$x'=sx(|x-X1/2|)*(x-X1/2)+X2/2; \text{ and}$$

$$y'=sy(|y-Y1/2|)*(y-Y1/2)+Y2/2,$$

control the first pixels of the main display to display a part of the input image data by emitting light corresponding to pixel values, included in the input image data, of the part of the input image data, and
control the second pixels of the border display to display a part of the extrapolated image data, wherein
x and y are pixel coordinates describing a location of a pixel on the main display,
x' and y' are pixel coordinates describing a location of a pixel on the border display,
X1 and Y1 denote dimensions of the main display in pixels,
X2 and Y2 denote dimensions of the border display in pixels, and
sx and sy are predefined scaling functions.

11. The display device of claim 10, wherein
the main display provides a field of view of less than or equal to 30 degrees, and
the border display enlarges the field of view to be greater than 30 degrees.

12. The display device of claim 11, wherein
the border display enlarges the field of view to be up to 100 degrees.

13. The display device of claim 11, wherein
the border display enlarges the field of view to be up to 200 degrees.

14. A head mounted display, comprising:
a first display device according to claim 10; and
a second display device according to claim 10, wherein
the main display of the first display device displays the part of the input image data to a left eye,
the border display of the first display device displays the part of the extrapolated image data to the left eye,
the main display of the second display device displays the part of the input image data to a right eye, and
the border display of the second display device displays the part of the extrapolated image data to the right eye.

15. The display device of claim 10, wherein the circuitry is configured to extrapolate the input image data by scaling the input image data.

16. The display device of claim 15, wherein the circuitry scales the input image data based on a non-linear scaling algorithm.

17. The display device of claim 10, wherein the circuitry removes the black borders prior to extrapolation of the input image data.

18. The display device of claim 10, wherein
the circuitry is configured to receive an input signal including the input image data, and
the circuitry extrapolates the input image data included in the input signal to obtain the extrapolated image data.

\* \* \* \* \*